A. B. BOOTH.
MEASURING AND RECORDING MACHINE.
APPLICATION FILED APR. 16, 1909.

965,434.

Patented July 26, 1910.
4 SHEETS—SHEET 2.

Witnesses
Inventor
Andrew B. Booth
By Chester W. Brown
Attorney

UNITED STATES PATENT OFFICE.

ANDREW B. BOOTH, OF GENESEE, LOUISIANA.

MEASURING AND RECORDING MACHINE.

965,434.  Specification of Letters Patent.  Patented July 26, 1910.

Application filed April 16, 1909. Serial No. 490,380.

*To all whom it may concern:*

Be it known that I, ANDREW B. BOOTH, a citizen of the United States, residing at the village of Genesee, in the parish of Tangipahoa and State of Louisiana, have invented certain new and useful Improvements in Measuring and Recording Machines, of which the following is a specification.

This invention relates to lumber measuring and recording machines.

One object of the invention is to provide a machine for automatically measuring the number of square feet in boards as they are passed through the machine, the number of square feet of lumber passed through the machine being automatically measured and recorded, so that the same may be read by the operator without any figuring or mental calculation.

Another object of the invention resides in the provision of a machine of the nature stated adapted to be readily attached to a planing machine and adapted to automatically record the square feet of varying thicknesses of lumber passing through the planer.

With the above and other objects in view, the present invention consists in the combination and arrangement of parts hereinafter more fully described, illustrated in the accompanying drawings and particularly pointed out in the appended claims, it being understood that changes may be made in the form, proportion, size and minor details without departing from the spirit or sacrificing any of the advantages of the invention.

Referring now more particularly to the accompanying drawings, the reference character 1 indicates an arm including an upright vertical part $a$ and a horizontally disposed part $b$ which is connected, preferably rigidly at $c$ to the vertical member 2 of the measuring and recording frame work. The upper end of the member 2 is provided with a socket 3 to receive one end of a shaft 4, whose opposite end is journaled in the upper end of the arm $a$, as at 5, there being a second shaft 6 journaled in said part $a$ of the arm 1 at 7, with its opposite end passed through an opening 8 in the shield 9 and journaled through the frame member 2, as clearly shown in Fig. 2.

Mounted upon the shaft 4 at equidistant points are loosely mounted wheels indicated by the characters 10, 11, 12, 13 and 14, each carrying a pinion 15, 16, 17, 18 and 19, respectively, said pinions being of decreasing size from the pinion 15 to the pinion 19 for speed gearing purposes. These pinions 15 to 19, inclusive, are designed to mesh with gear wheels 20, 21, 22, 23 and 24, respectively, which gear wheels 20 to 24 are of gradually decreasing size from the gear 24 to the gear 20 for coöperation with the gradually increasing diameters of the aforesaid pinions to coöperate with the latter for the purpose of varying the speed of rotation of the shaft 6 and the mechanism to be hereinafter described. These gear wheels 20 to 24, inclusive, are loosely mounted upon their shaft 6 and are clutched thereto independently one of another, through the instrumentality of pivoted pawls 25 carried by each of the gears 20 to 24, inclusive, and which are designed to engage in the teeth of the ratchets 26, fixedly mounted upon the shaft 6, one ratchet adjacent each gear wheel. The pawls are held in operative position by the springs 25', 25ª indicating a post.

Figures 2, 3, 4:
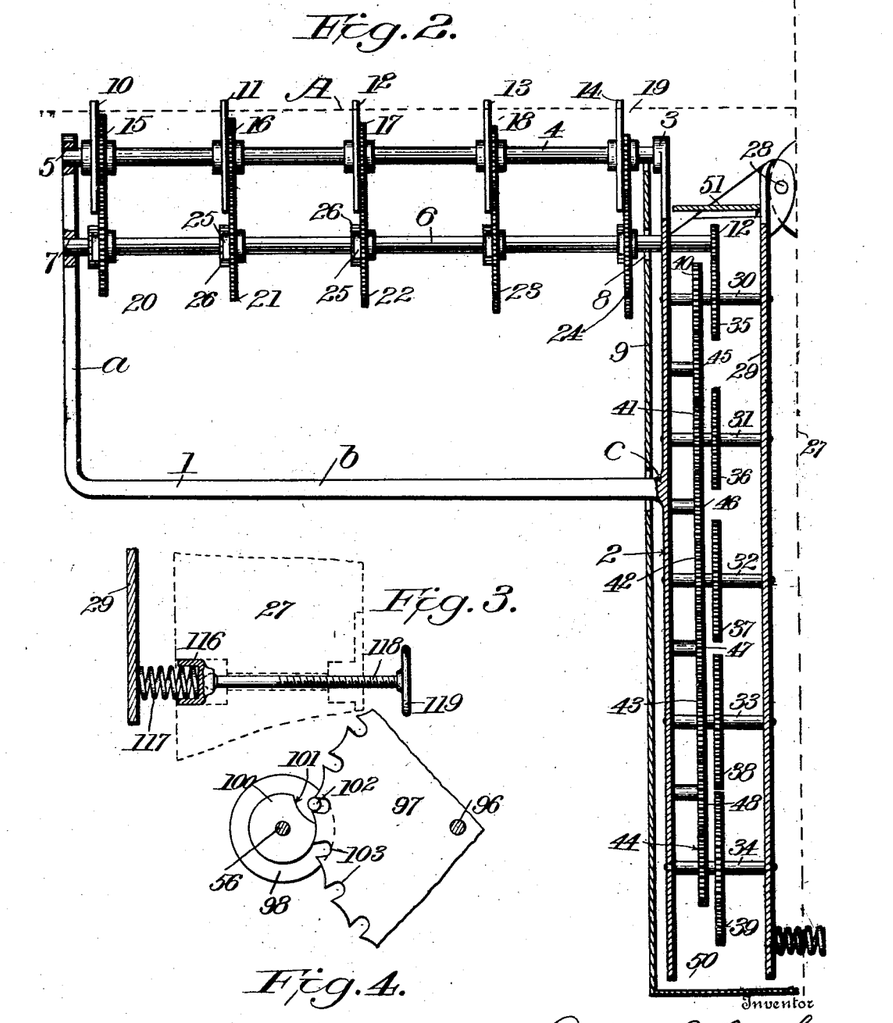
Fig. 2 is a transverse sectional view on the line a—a of Fig. 1.
Fig. 3 is a detail view partly in elevation and partly in section of the means for holding the train of gears and driven gears in operative positions.
Fig. 4 is a fragmentary detail view of the Geneva or Swiss movement.
Figures 5, 6:
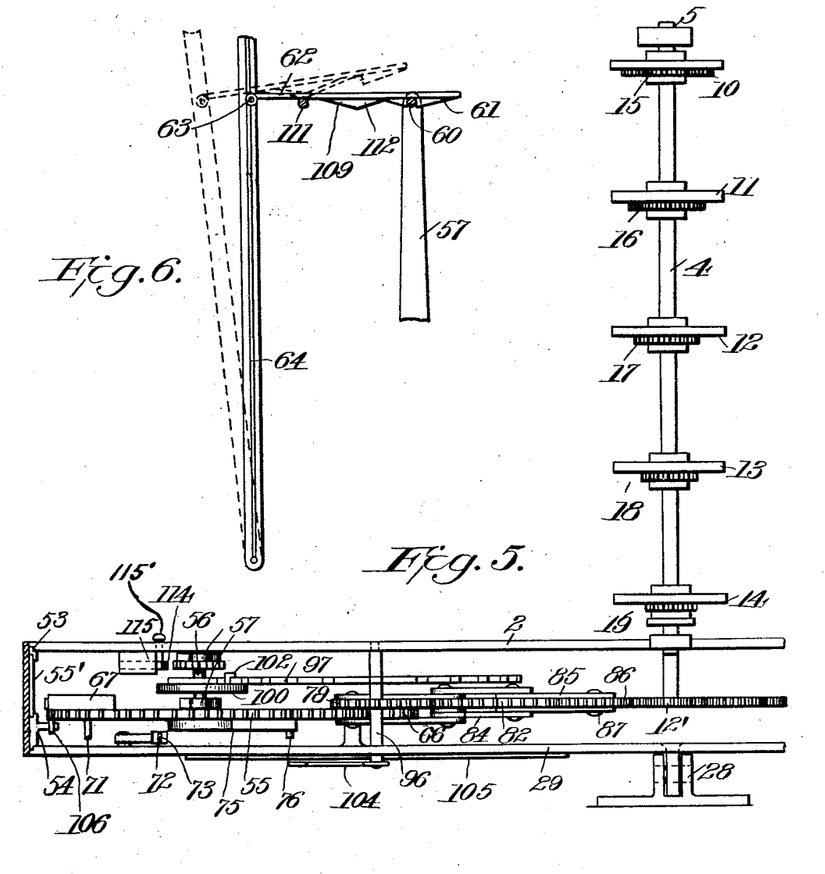
Fig. 5 is a top plan view.
Fig. 6 is a fragmentary elevation illustrating the connection between the door and the arm upon which the die wheel is mounted.
Figure 7:
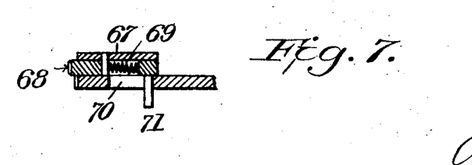
Fig. 7 is a detail sectional view of the spring controlled die.

The dotted line 27 in Fig. 2 indicates the side of a planing machine, not shown, to which is pivoted at 28 a frame member 29 in which latter and the aforesaid frame member 2 are journaled a series of short shafts 30, 31, 32, 33 and 34, carrying gears 35, 36, 37, 38 and 39, respectively, which gears are of gradually increasing diameter from top to bottom for a purpose presently explained. Mounted upon said shafts 30 to 34, inclusive, are other gears 40, 41, 42, 43 and 44, which are arranged to provide a train of gears through the instrumentality of the idle gears 45, 46, 47 and 48 interposed between the gears 40 to 44, inclusive.

Figure 1:
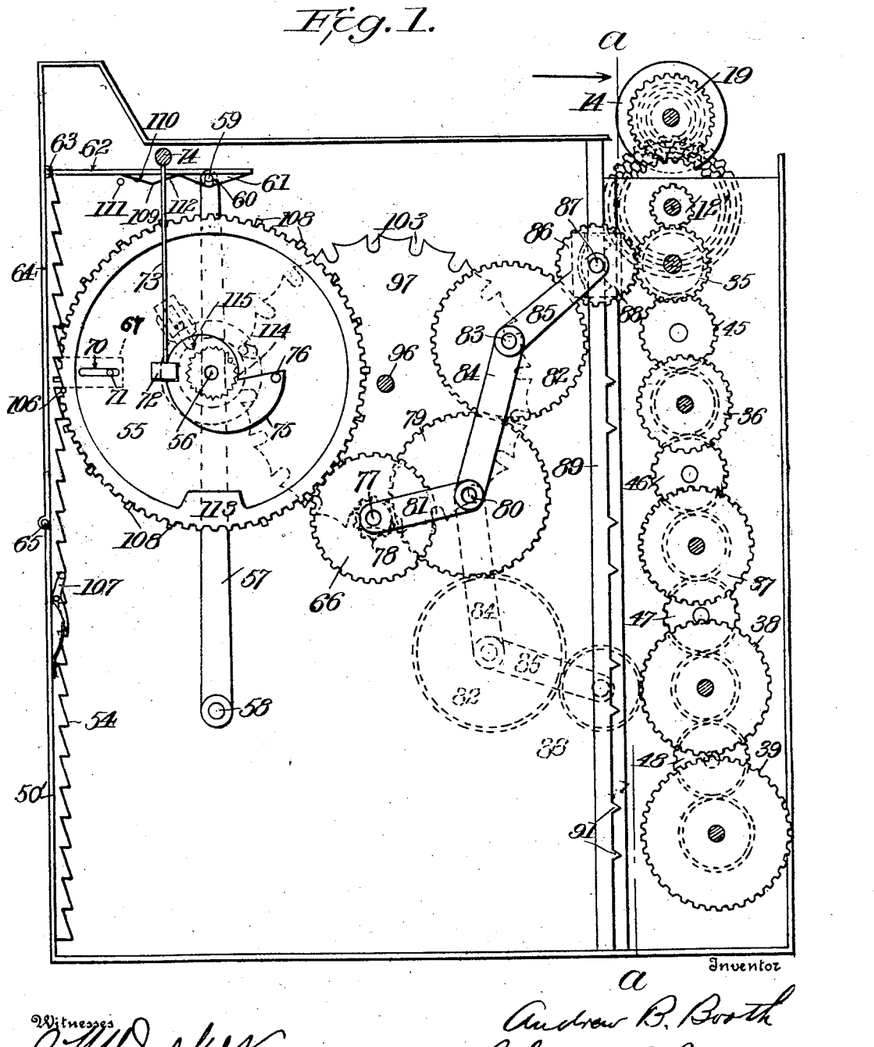
—Figure 1 is a side elevation with one side of the casing removed.

The frame members 2 and 29 are connected at their ends by the end pieces 50 and 50', there being a door 64 pivoted at 65 to the end piece 50', as shown in Fig. 1. The ends and sides 50, 50', 64, and 2, 29, respectively, form a casing, and there is preferably disposed at the upper end thereof a top member 51 adapted to prevent dust and other foreign matter falling into the casing and interfering with the operation of the gears disposed therein At the end 50' of the casing, just alluded to, is a guide consisting of the vertical member 53 and the toothed rack 54, between which is disposed a card 55', which latter is moved upwardly with the guide as the latter is moved upwardly in a manner hereinafter explained, the card 55' being adapted to receive impressions from the die wheel 55 in a manner to be hereinafter explained.

The character 56 indicates a shaft upon which the die wheel 55 is fixedly mounted, said shaft 56 being journaled in a lever 57 pivoted to the framework at 58 and which has a pin 59 projecting from its upper end for engagement normally in the recess 60 of the cam 61 carried at the outer end of the arm 62, which is firmly attached to the door 64 at 63. The arm 62 is constructed of spring metal, and its pressure is so adjusted as to continually press downward against the pin 111 and is only released from engagement with the pin 59 when in the operation of opening the door it is raised by the cam 110 sliding on said pin 111. The toothed rack 54 and its coöperating guide 53 are mounted in grooves at the end of the second casing, and designed to slide upward and downward to carry the card 55'. The door 64 is pivoted to the casing at 65, and when opened to remove the card, as it is swung outwardly, the recess 60 of the arm 62 engages the pin 59 at the top of the lever 57 and forces the die wheel 55 out of mesh with 66 and against the card 55'.

Formed upon one side of the die wheel 55 is a casing 67, in which is mounted a printing die 68, which is held normally within its casing 67 through the instrumentality of a suitable spring 69, there being a slot 70 formed in the die wheel 55 through which a pin 71 projects from the printing die 68, this pin 71 being adapted to be engaged by the hammer 72 on the spring arm 73, rigidly mounted at 74, to force the printing die into engagement with the card 55' whenever 500 square feet of lumber has been passed through the machine in a manner to be explained. One means for effecting movement of the hammer 72 into engagement with the pin 71 to effect such printing, as will indicate each time 500 feet of lumber has been passed through the machine, is to mount upon one face of the die wheel 55 and also upon the shaft 56 a cam 75 which carries a pin 76, so that as the die wheel 55 is rotated in a manner hereinafter explained, the cam 75 will also be rotated and its cam 75 will bring the pin 76 into engagement with the spring arm 73 and force the latter to a position farther away from the pin 71 than is shown in Fig. 1, and when the cam 75 has moved to a certain point, when the die 68 is immediately opposite the card 55', the spring arm 73 becomes automatically released from engagement with the pin 76, and by virtue of its resiliency, snaps quickly into engagement with the pin 71 and forces the printing die 68 into printing engagement with the aforesaid card 55'.

The aforesaid gear 66 which meshes with the die wheel 55 is mounted upon a shaft 77 upon which shaft 77 there is also mounted a pinion 78 having mesh with a gear 79 journaled upon a fixed shaft 80, there being a pair of links 81 secured to said shaft 77 and 80 in embracing relation with the gear 66, pinion 78 and the gear 79. Meshing with this gear 79 is another gear 82 which is mounted upon a pivot 83 which connects the pairs of links 84 and 85, which pair of links 84 embraces said gears 79 and 82, the pair of links 85 embracing the gear 82 and also a driving pinion 86, which is mounted upon a pivot 87 carried by the slide 88, which latter is mounted for vertical movement upon the guide 89 having projections 90 adapted to engage in the notches 91 of the guide 89, there being a spring 92 disposed between one wall of the slide 88 and one side of the guide 89 to hold the slide at its different fixed positions upon the guide 89 according to the position of the driving gear 86 which is adapted to be shifted into interchangeable mesh with the gears 35, 36, 37, 38 and 39 according to the thickness of lumber passing through the machine, as will be explained. It will thus be seen why the shafts 77 and 80 are fixed, while movable pivots 83 and 87 are employed, such construction and arrangement permitting of a shifting of the gears 82 and 86 with relation to the fixed gears 66 and 79, as will be apparent by the dotted lines in Fig. 1. This shifting of the gears 82 and 86 and the slide 88 is effected through the instrumentality of a series of link connections 93 with the cutter head or other part of the planing machine, indicated at 94, there being a spring 95 between the link 93, which connects with the slide 88, and the slide to overcome any undue jarring which might be imparted to the slide 88 by the jarring of the cutter head 94 in its operation of planing the lumber.

The character 96 indicates a fixed shaft upon which is journaled a wheel 97 of a Swiss movement, whose coöperating element is indicated at 98 and which is in the form of a disk mounted upon a shaft 56 and having a lateral projecting part 100, which is cut away at 101, opposite which cut away portion is a pin 102 adapted to engage in the notches 103 of the plate 97 to rotate the shaft 96 whenever said pin 102 engages in one of the notches 103 to shift the pointer 104 on the shaft 96 to indicate on the dial 105 the number of feet of finished lumber passed through the machine.

Assuming that lumber of one foot wide and one inch thick is being passed through the machine, the same will be passed over the wheel 10, the wheels 10 to 14, inclusive, being disposed between rows of the usual feed rollers of planing machines (not shown), so that their peripheries will reach a point slightly higher than the dotted line A. As the lumber is passed over the wheel 10, its gear 15 being in mesh with the gear 20, causes the pawl 25 to engage with the ratchet 26, driving the shaft 6 forward as the gear 20 is rotated, and causing the pinion 12' to rotate. At this time the drive gear 86 is disposed in mesh with the gear 35 and the gear 35 being driven by the pinion 12' causes corresponding operation of the gears 82, 79 and 66, and the latter being in mesh with the die wheel 55, the latter is caused to rotate upon its shaft 56. The lumber is continuously forced through the machine, and by the time 500 feet of lumber one foot wide and one inch thick has been passed therethrough, the pin 76 on the cam 75 will have engaged the spring arm 73 of the hammer 72 and forced the same to such a position as to provide for a quick-snap release of the arm 73 immediately at the time the 500 feet have been passed through the machine, causing the hammer 72 to strike the pin 71 of the printing die 68 and effect a printing announcement on the card 55'. When the die 68 is brought to the position to effect this printing operation, the pin 106, near the periphery of the die wheel 55, will engage one of the notches of the toothed rack 54 and lift it, together with the card in the other guide member 53 (the card being secured to the rack) so as to be ready to receive the next impression when 500 feet more of lumber has passed through the machine, the toothed rack 54 and consequently the card 55' being held in its adjusted position by means of the spring actuated dog 107. At the end of the day, it may be time to discontinue work when the operator is not at the point of passing the required 500 feet through the machine. In such event, the hinged door 64 is swung upon its pivot 65, and the shoulder 60 of the arm 62 being behind the pin 59 of the lever 57 upon which the die wheel 55 is mounted, the latter is drawn from mesh with the gear 66 and outwardly with the door.

The die wheel 55 has on its periphery a series of nineteen printing dies 108, more or less, which are designed to engage the card 55' and imprint thereon the fraction of the 500 feet passed through the machine, the dies carrying the successive numbers from 25 to 475 by 25"s. By means of the mechanism hereinafter described, the die wheel 55 presents to the card 55' the die 108 nearest the printing point at the time the door is opened. As the door 64 is opened, the pin 59 of the lever 57 moves away from the shoulder 60 of the arm 62 incident to the fact that the arm 62 has a double cam 109, whose face 110 rides upon the pin 111 when the door is open, and whose face 112 rides upon said pin 111, as may also the cam face of the cam 61, because the shoulder 60 of the arm 62 will fall behind the pin 59 when the die wheel is forced back to its normal position.

One side of the die wheel 55 is weighted at 113 to cause the same to assume its normal initial position prior to operation, and in order to present the die 108 nearest the printing point to the card 55', and to prevent this weight 113 from causing premature movement of the die wheel 55 until such die 108 has printed upon the card, I provide on the shaft 56 a ratchet 114 with which coöperates a spring actuated pawl 115 adapted to engage in one of the twenty notches between the teeth, which notches correspond with the nineteen dies 108 and the one die 68 to center the same whenever the door 64 is opened and thus, as above described, cause one of said dies 108 to print the fractional number of feet of lumber that has been passed through said machine short of or in excess of an even 500 feet.

Figures 8, 9, 10, 11, 12:
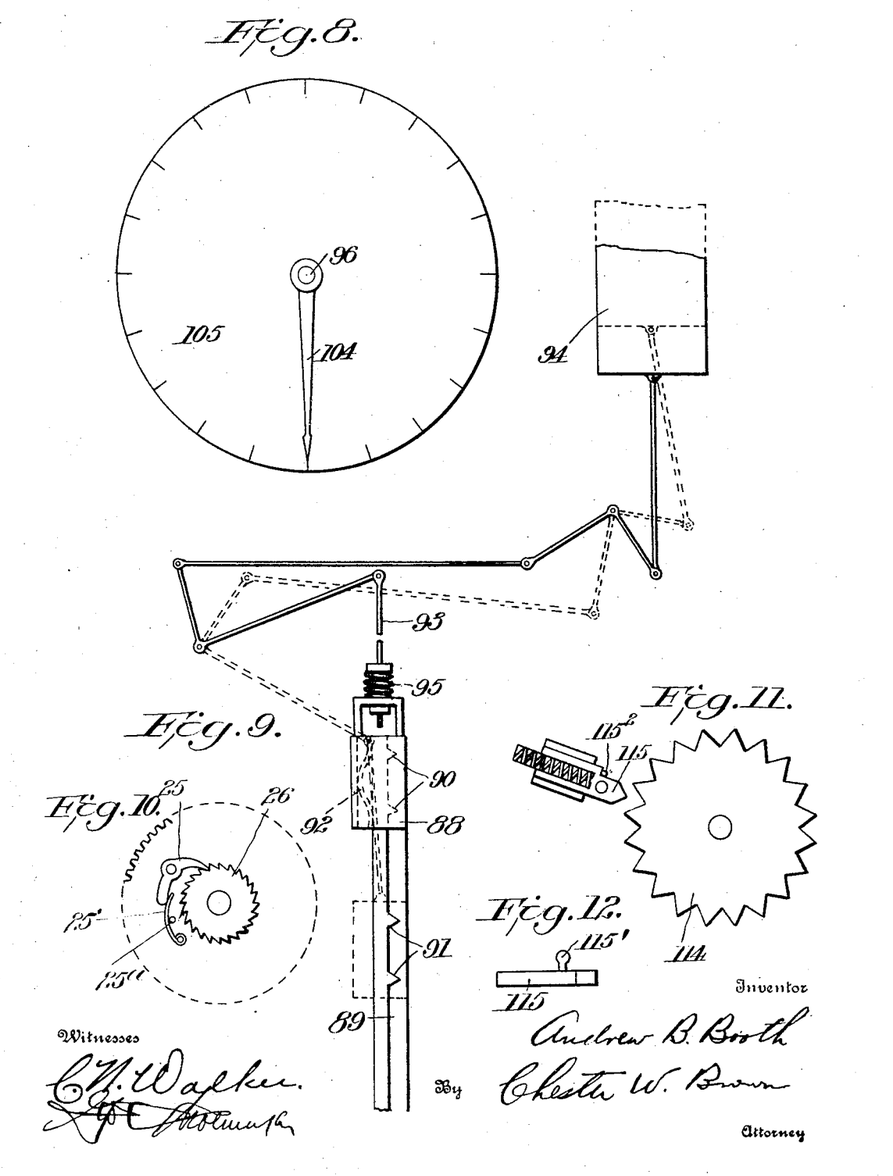
Fig. 8 is a detail view of the indicator dial.
Fig. 9 is a detail view illustrating the connection between the cutter head and the slide upon which the driving gear is mounted.
Fig. 10 is a detail view illustrating one of the feed rollers and the ratchet mechanism associated therewith.
Fig. 11 is an enlarged detail view illustrating the pawl and ratchet mechanism designed to limit the outward swing of the die wheel.
Fig. 12 is a detail view of the pawl detached from the pawl and ratchet mechanism illustrated in Fig. 10.

The pawl 115 is mounted upon the casing and is normally out of engagement with the ratchet 114, when the device is in operation, but whenever the wheel 55, carrying with it the ratchet 114, is forced to the left by opening of the door 64, as described, the pawl 115 engages the notch of the ratchet 114 and holds it from turning and at the same time centers the nearest die 108 at the printing point and further movement of the wheel 55 causes that die 108 to print its fractional number of feet on the card 55'. The pawl 115 has a knob 115' (Fig. 12) by which it may be operated manually, and a post $115^2$ limits the forward movement of said pawl. It is apparent that when boards of a uniform width of 6 inches and a given length are passed through said machine, it should register one-half more feet board measure than when boards of only 4 inches in width and the same length are passed through said machine. To accomplish this the wheel 13 is so geared to shaft 6 through the gears 18, 23, and pawl and ratchet 25—26 that when six inch lumber is being passed through said machine, the shaft 6 will rotate one-half faster than when four inch lumber is passed through said machine, and said shaft is being operated by wheel 14, and gears 19, 24, and pawl and ratchet mechanism 25—26. This arrangement of ratchet 25 and pawl for connecting 24 operatively with the shaft 6, is such that when wheel 14 and the gears operated by it are solely operating shaft 6, the pawl will engage the gear or ratchet 25, and drive said shaft 6 forward, but when the wheel 13 and its connecting gears and ratchet are driving said shaft more rapidly than gear 24 is rotated by wheel 14 and its connecting gears, that the shaft 6 may rotate forward more rapidly than said gear 24 is traveling. In like manner, when lumber of wider size is being passed through said machine, the shaft will be rotated more rapidly than gear 23 is traveling, and the connection of pawl and ratchet 25—26 between said gear and shaft 6 permits said shaft to be rotated at such higher velocity. Thus said wheels are so disposed that boards four inches in width will operate only wheel 14; board six inches in width will operate wheels 14 and 13, boards eight inches in width will operate wheels 14, 13, and 12, while boards ten inches in width will operate wheels 14, 13, 12, and 11 and boards 12 inches in width will operate all five of the wheels. The wheel 10 shown is geared to shaft 6 through the intermediary gears 15 and 20, so that when boards of the aggregate length of 500 feet have passed through said machine, each board 12 inches in width, the shaft 6, and through the intermediary gears 12′, etc., the die wheel 55 will be rotated once, and will record upon the paper or card 500 feet of lumber as having been passed through the said machine. The wheel 14 is so geared to the shaft 6 that when boards four inches in width and aggregating 500 feet in length have been passed through said machine, there will be recorded but one-third of 500 feet to compensate for the lesser width. In like manner, when boards six inches in width and 500 feet in length have been passed through said machine, said wheel 13 and intermediary gears will rotate the shaft 6 so that the register will show only one-half of 500 feet as having been passed through said machine. In like manner wheel 12 and intermediary gears will register but two-thirds, and wheel 11 and intermediary gears will register but five-sixths of the 500 feet, to compensate for the lesser width than when 12 inch boards are passed through the machine. From the explanation as shown, it is apparent that 12 inch boards will operate all of said wheels 10 to 14, but as the wheel 10 is geared to the shaft so as to rotate the shaft more rapidly than any of the wheels 11 to 14, it is the only one which will register, as the shaft will be rotated loosely within each of the other gears 21 to 24 mounted thereon. In like manner, the only wheel to register when any board is passed through said machine will be the wheel to the extreme left operated by said board. As has been explained above, each of said gears 20 to 24 is loosely mounted upon shaft 6, and only operatively connected therewith by the pawls 25, and thus the shaft may be rotated freely more rapidly than said gear is being operated by its corresponding gear and wheel as 19 and 14. It will thus be seen that as each board is passed through said machine, the various wheels 10 to 14, through the mechanism described, cause to be registered by the wheel 55 one foot for every board one foot wide, and one foot long, and a proportionate number of feet for every foot in length of every board less than one foot in width, said mechanism, as shown, operating said mechanism automatically and without any act on the part of the operator other than that of passing said boards through said machine in the usual way.

So long as the cutter head remains set to operate on boards one inch in thickness, the mechanism above described is all that is required to accurately register the amount of lumber passed through said machine. To correctly register the board measure of lumber of a greater thickness than one inch, I have arranged the connection between the slide 88 carrying the gear 86, so that when the cutter head is set to cut lumber one inch in thickness, the gear 86 will mesh with the gear 35 to register the amount of lumber board measure, as described above. Whenever the cutter head is changed to plane lumber of a greater thickness as one and one-fourth inch in thickness, the setting of the cutter head changes the slide 88 to the second position, and with it the gear 86 from operative connection with 35 to operative connection with gear wheel 36. Gear wheel 36, through the gears 40, 45 and 41, is so geared that it will rotate the gear 86 one-fourth farther each time a piece of lumber has passed through the machine than it did when gear 86 was in mesh with gear 35. By this means the registering wheel 55 is advanced one-fourth farther, and it will be apparent that when the machine is set as at present described, and lumber aggregating 500 feet in length and one foot wide, and one and one-fourth inches in thickness are passed through the machine, the device 55 will record 625 feet board measure, instead of 500 feet board measure as when the lumber one inch in thickness had been passed through said machine. In like manner when the cutter head is set for thickness of 1½, 1¾ and 2 inches, the gear 86 will be thrown in mesh with 37, 38 and 39, respectively, and each of these gears is so connected with the train of gears from 36, that it operates 86 enough faster to compensate for the increased thickness of the lumber being planed, and thus the machine at 55 will accurately and automatically register the board measure of the thickness, and thus the total board measure will be indicated continually upon the record, without any act of the operator other than the usual one of operating the machine, and setting the cutter head for the various thicknesses of lumber being planed.

While I have shown the machine as designed to measure lumber of the various widths of 4 inches, 6 inches, 8 inches, 10 inches and 12 inches, and of the various thicknesses of 1 inch, 1¼ inch thickness, 1½ inch thickness, 1¾ inch thickness and 2 inch thickness, it is apparent that the machine may be varied to measure any other widths, and any other or different thicknesses by merely varying the number and position of the parts shown, and the method of gearing the same to one another.

Since the casing composed of parts 2, 29 and 50 is swung from the plate 28, I dispose against the planing machine indicated at 27 in Fig. 2, a cup 116 in which I dispose a spring 117 which bears against the outer face of the member 29 of said casing. This spring 117 serves to hold the lower end of the casing yieldably and the spring 117 may be tensioned through the instrumentality of a screw bolt 118 provided with a handle 119, the screw bolt 118 being journaled in the framework 27 of the planing machine.

What is claimed is:—

1. In a lumber measuring and recording machine, a casing, a train of intermeshing gears in the casing, a series of spaced driven gears in the casing, a shaft having one end projecting into the casing and provided with a pinion for mesh with the uppermost of the aforesaid driven members, a series of gear wheels on said shaft, a pawl and ratchet mechanism mounted adjacent each of the gears on the shaft, a second shaft, a series of spaced rollers on the second shaft, a gear wheel mounted adjacent each roller for mesh with the corresponding gear wheel of the first mentioned shaft, a die wheel having spaced fixed dies on its periphery, a spring controlled die carried by the die wheel, said die wheel having teeth on its periphery, a pivoted arm upon which the die wheel is mounted, another shaft, a gear wheel on said shaft normally in mesh with said die wheel, a pinion on the last mentioned shaft, another gear arranged for mesh with the last mentioned pinion, links pivotally mounted upon the axis of the last mentioned gear wheel, a gear wheel journaled in said links to swing therewith, another set of links mounted upon the axis of the swinging gear, a driving gear mounted in the last mentioned set of links and adapted to swing with the aforesaid swinging gear so that it may be engaged interchangeably with the aforesaid driven members to effect rotation of the die wheel when the aforesaid rollers are operated, a yieldably mounted hammer, and means carried by the die wheel for engagement with the hammer to effect operation of the latter at a predetermined time and a subsequent operation of the aforesaid spring controlled die to effect a printing operation upon the record sheet.

2. In a lumber measuring and recording machine, a casing, a train of intermeshing gears in the casing, a series of spaced driven gears in the casing, a shaft having one end projecting into the casing and provided with a pinion for mesh with the uppermost of the aforesaid driven members, a series of gear wheels on said shaft, a pawl and ratchet mechanism mounted adjacent each of the gears on the shaft, a second shaft, a series of spaced rollers on the second shaft, a gear wheel mounted adjacent each roller for mesh with the corresponding gear wheel of the first mentioned shaft, a die wheel having spaced fixed dies on its periphery, a spring controlled die carried by the die wheel, said die wheel having teeth on its periphery, a pivoted arm upon which the die wheel is mounted, another shaft, a gear wheel on said shaft normally in mesh with said die wheel, a pinion on the last mentioned shaft, another gear arranged for mesh with the last mentioned pinion, links pivotally mounted upon the axis of the last mentioned gear wheel, a gear wheel journaled in said links to swing therewith, another set of links mounted upon the axis of the swinging gear, a driving gear mounted in the last mentioned set of links and adapted to swing with the aforesaid swinging gear so that it may be engaged interchangeably with the aforesaid driven members to effect rotation of the die wheel when the aforesaid rollers are operated, a yieldably mounted hammer, means carried by the die wheel for engagement with the hammer to effect operation of the latter at a predetermined time and a subsequent operation of the aforesaid spring controlled die to effect a printing operation upon the record sheet, and means for swinging the die wheel and the arm upon which the latter is mounted to effect a printing operation upon the record sheet by one of the aforesaid fixed dies on the periphery of the die wheel.

3. In a lumber measuring and recording machine, a movably mounted die wheel, a plurality of fixed dies on the periphery of the die wheel, a spring controlled die carried by the die wheel, means for automatically operating the spring controlled die to effect printing on the record sheet, and means whereby the die wheel may be shifted to effect a printing engagement of one of the fixed dies on said record sheet.

4. In a lumber measuring and recording machine, a die wheel, a plurality of fixed dies on the periphery of the die wheel, a spring controlled die carried by the die wheel, means for automatically operating the spring controlled die to effect printing on the record sheet, means whereby the die wheel may be shifted to effect a printing engagement of one of the fixed dies on said record sheet, and means for raising the record sheet automatically subsequent to each operation of the spring controlled die.

5. In a lumber measuring and recording machine, a die wheel, a plurality of fixed dies on the die wheel, a spring controlled die carried by the die wheel, a train of gears, a set of driven gears to operate said train of gears, a driven gear mounted for shifting movement into engagement with the driven gears interchangeably to effect an operation of the train of gears, geared connections between the driving gear and the die wheel, means for automatically operating the spring controlled die to effect printing on a record sheet, means whereby the record sheet may be raised automatically subsequent to each operation of the spring controlled die, and means whereby the die wheel may be shifted out of operative relation with the aforesaid geared connections between it and the driving gear to effect printing of the record sheet by the aforesaid fixed dies, one at a time.

6. In a lumber measuring and recording machine, a die wheel, a plurality of fixed dies on the die wheel, a spring controlled die carried by the die wheel, means for automatically operating the spring controlled die to effect printing on the record sheet by a spring controlled die, and means whereby the record sheet may be shifted automatically at predetermined times.

7. In a lumber measuring and recording machine, a casing, a door for the casing, a die wheel mounted in the casing, a plurality of fixed dies on the die wheel, a spring controlled die carried by the die wheel, a hammer for automatically operating the spring controlled die to effect printing on the record sheet, a pivoted arm upon which the die wheel is mounted, a connection between said pivoted arm and said door, whereby when the door is opened the die wheel may be shifted to present one of its fixed dies to said record sheet and by the fixed die engaging the record sheet imprint on the latter.

8. In a lumber measuring and recording machine, a casing, a door for the casing, a die wheel mounted in the casing, a plurality of fixed dies on the die wheel, a spring controlled die carried by the die wheel, a hammer for automatically operating the spring controlled die to effect printing on the record sheet, a pivoted arm upon which the die wheel is mounted, a connection between said pivoted arm and said door, whereby when the door is opened the die wheel may be shifted to present one of its fixed dies to said record sheet and by the fixed die engaging the record sheet to imprint on the latter, and means for raising the record sheet automatically subsequent to each operation of the spring controlled die.

9. In a lumber measuring and recording machine, a plurality of wheels rotated by the lumber, a plurality of gear wheels having geared connection with the first mentioned wheels, a die wheel, a stationary train of gears, separate gears arranged to operate the train of gears, and another train of gears having geared connection with said die wheel and including a gear shiftable into mesh with said separate gears interchangeably to effect corresponding operation of said die wheel.

10. In a lumber measuring and recording machine, a plurality of wheels rotated by the lumber, a plurality of gear wheels having geared connection with the first mentioned wheels, a die wheel, a stationary train of gears, separate gears arranged to operate the train of gears, another train of gears having geared connection with said die wheel and including a gear shiftable into mesh with said separate gears interchangeably to effect corresponding operation of said die wheel, and means to shift the die wheel out of coöperative relation with the second mentioned train of gears.

11. In a lumber measuring and recording machine, a plurality of wheels rotated by the lumber, a plurality of gear wheels having geared connection with the first mentioned wheels, a die wheel, a stationary train of gears, separate gears arranged to operate the train of gears, another train of gears having geared connection with said die wheel and including a gear shiftable into mesh with said separate gears interchangeably to effect corresponding operation of said die wheel, means to shift the die wheel out of coöperative relation with the second mentioned train of gears, the die wheel being weighted to cause it to assume a normal starting point when shifted back to coöperative relation with said second train of gears, and means for holding the die wheel against rotation incident to its weight when it is shifted out of coöperative relation with said second train of gears.

In testimony whereof I have affixed my signature, in presence of two witnesses.

ANDREW B. BOOTH.

Witnesses:
E. T. YOUNGFUT,
J. M. CHERRY.